(12) United States Patent
Ma et al.

(10) Patent No.: US 9,171,134 B2
(45) Date of Patent: Oct. 27, 2015

(54) ELECTRONIC DEVICE AND SECURE SWITCH MODULE THEREOF

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Song Ma, Shenzhen (CN); Jun-Hui Wang, Shenzhen (CN); Wu Zhou, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 111 days.

(21) Appl. No.: 14/158,780

(22) Filed: Jan. 18, 2014

(65) Prior Publication Data
US 2014/0204530 A1     Jul. 24, 2014

(30) Foreign Application Priority Data
Jan. 23, 2013   (CN) .......................... 2013 1 0024484

(51) Int. Cl.
| H01H 3/00 | (2006.01) |
| G06F 21/00 | (2013.01) |
| H01H 27/06 | (2006.01) |
| G06F 1/26 | (2006.01) |
| G11B 33/02 | (2006.01) |

(52) U.S. Cl.
CPC ...... *G06F 21/00* (2013.01); *G06F 1/26* (2013.01); *H01H 27/06* (2013.01); *G11B 33/022* (2013.01); *Y10T 307/937* (2015.04)

(58) Field of Classification Search
CPC ......... G06F 21/00; G06F 1/26; G11B 33/022; H01H 27/06; Y10T 307/937
See application file for complete search history.

(56) References Cited

U.S. PATENT DOCUMENTS

| 4,482,789 | A | * | 11/1984 | McVey | ........................ 200/43.02 |
| 5,338,218 | A | * | 8/1994 | Haas | ............................. 439/346 |
| 5,870,281 | A | * | 2/1999 | Kim | ......................... 361/679.57 |
| 6,735,698 | B1 | * | 5/2004 | Callam | ............................ 726/35 |
| 7,080,889 | B2 | * | 7/2006 | Ling et al. | ..................... 200/334 |
| 8,726,408 | B2 | * | 5/2014 | Wang | .............................. 726/34 |
| RE44,933 | E | * | 6/2014 | Chu | ................................. 726/19 |
| 2002/0185917 | A1 | * | 12/2002 | Goss | ............................ 307/112 |
| 2004/0160129 | A1 | * | 8/2004 | Dahlberg | ...................... 307/116 |
| 2005/0184857 | A1 | * | 8/2005 | Roatis et al. | ................. 340/5.73 |
| 2007/0016965 | A1 | * | 1/2007 | Dan et al. | ........................ 726/34 |
| 2007/0205183 | A1 | * | 9/2007 | Haas | ............................. 218/138 |

* cited by examiner

*Primary Examiner* — Daniel Cavallari
(74) *Attorney, Agent, or Firm* — Novak Druce Connolly Bove + Quigg LLP

(57) ABSTRACT

A secure switch module to allow only authorized keyholders to power on an electronic device includes a lock, a key matching the lock, and a power switch. The lock includes a first lock pin electrically connected to a ground pin of a motherboard of the electronic device, and a second lock pin. The power switch includes a button, a first elastic conductive sheet electrically connected to the second lock pin, and a second elastic conductive sheet electrically connected to a power on pin of the motherboard. When the key is engaged with the lock and the button is pressed, the first lock pin is electrically connected to the second lock pin, the first elastic conductive sheet is electrically connected to the second elastic conductive sheet, the power on pin receives a low level signal, and the electronic device is turned on.

4 Claims, 3 Drawing Sheets

ELECTRONIC DEVICE AND SECURE SWITCH MODULE THEREOF

BACKGROUND

1. Technical Field

The present disclosure relates to electronic devices, and particularly to an electronic device comprising a secure switch module.

2. Description of Related Art

Most computer systems include a power button installed on a front panel of the computer systems. Anyone can power on the computer system by pressing the power button. Therefore, security of the computer system is reduced.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references can mean "at least one."

Figure 1:
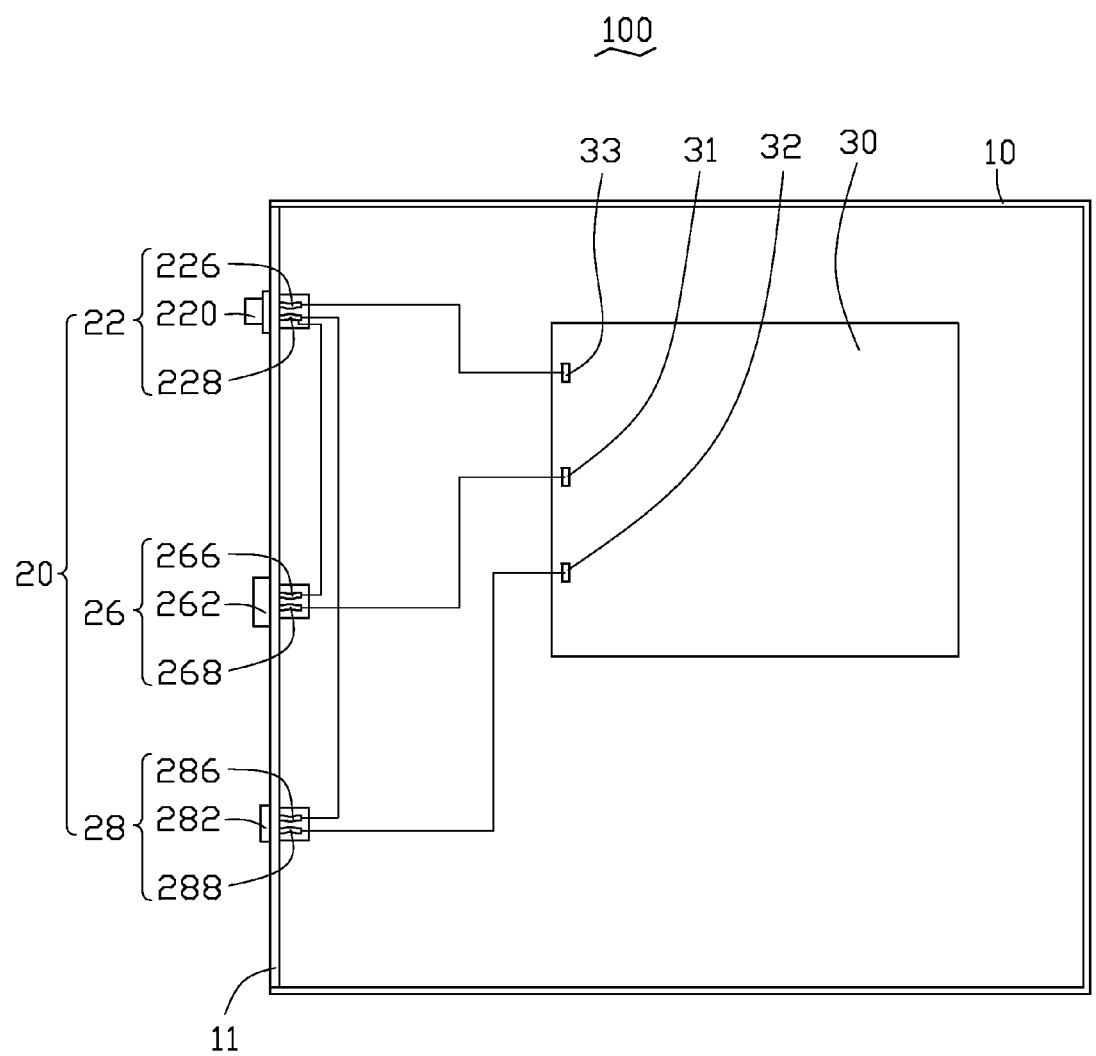
FIG. 1 is a schematic view of an embodiment of an electronic device, wherein the electronic device comprises a panel and a secure switch module assembled on the panel.
Figure 2:
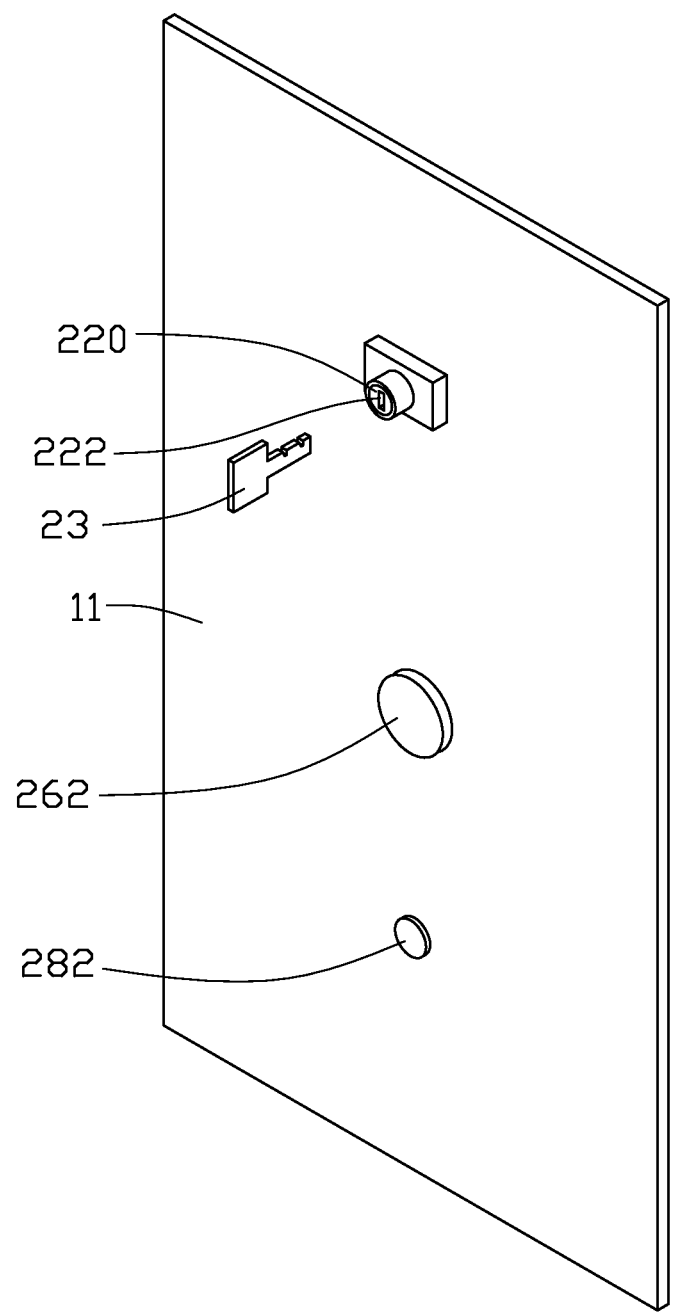
FIG. 2 is an isometric view of the panel of FIG. 1.
Figure 3:
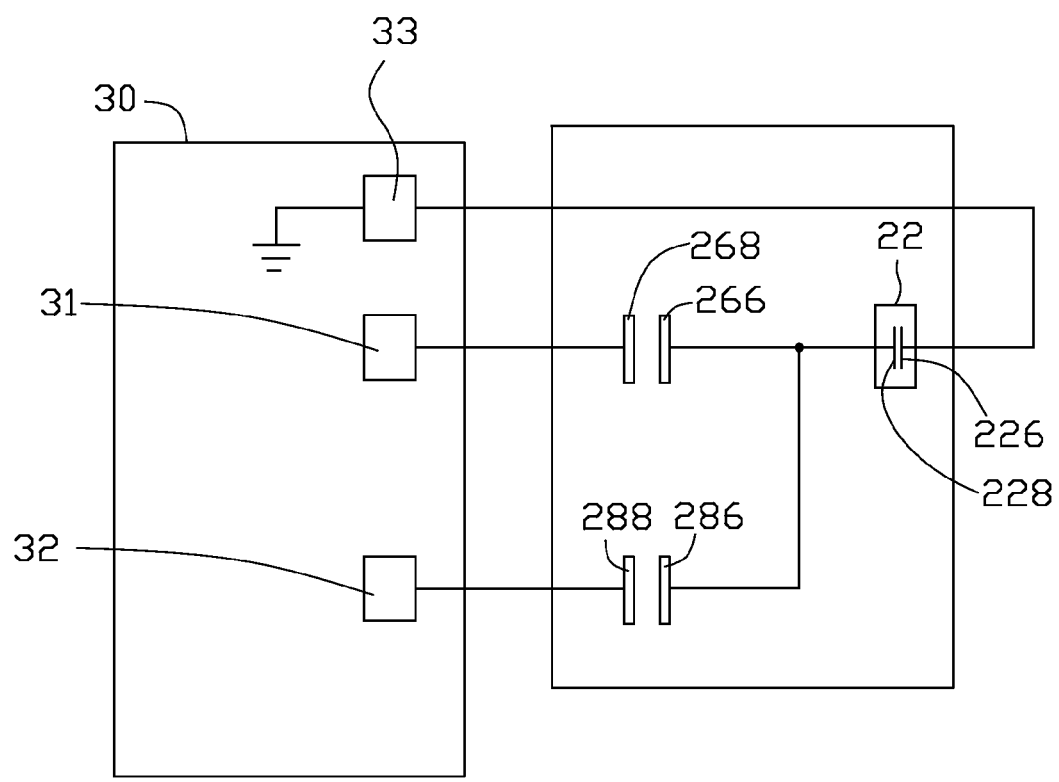
FIG. 3 is a circuit diagram of the secure switch module of FIG. 1.

FIGS. 1-3 show an embodiment of an electronic device 100. The electronic device 100 comprises a chassis 10, a secure switch module 20 assembled on the chassis 10, and a motherboard 30 received in the chassis 10. In one embodiment, the electronic device 100 can be a server, a computer, a printer, or other electronic device.

The chassis 10 comprises a panel 11. The secure switch module 20 comprises a lock 22, a power switch 26, and a reset switch 28. The lock 22, the power switch 26, and the reset switch 28 are assembled on the panel 11. The lock 22 comprises a core 220, a keyhole 222 defined in the core 220 to receive a key 23 matching the lock 22, and two lock pins 226 and 228. The power switch 26 comprises a button 262 and two elastic conductive sheets 266 and 268. The reset switch 28 comprises a button 282 and two elastic conductive sheets 286 and 288. The motherboard 30 comprises a power on pin 31 to receive a low level power on signal, such as logic 0, a reset pin 32 to receive a low level reset signal, and a ground pin 33 connected to a ground layer (not shown) of the motherboard 30. The lock pin 226 is electrically connected to the ground pin 33 and is grounded through the ground pin 33. The lock pin 228 is electrically connected to the conductive sheets 266 and 286. The conductive sheet 268 is electrically connected to the power on pin 31. The conductive sheet 288 is electrically connected to the reset pin 32.

In use, only authorized users possess the key 23. When the key 23 is inserted into the keyhole 222 and is rotated, the core 220 is rotated along with the key 23 to make the lock pin 226 electrically connect to or disconnect from the lock pin 228.

When the authorized user wants to use the electronic device 100, the key 23 is inserted into the keyhole 222 and is rotated to make the lock pin 226 electrically connect to the lock pin 228. When the button 262 is pressed, the elastic conductive sheet 266 is electrically connected to the elastic conductive sheet 268, and the elastic conductive sheet 268 is grounded through the elastic conductive sheet 266, the lock pin 228, the lock pin 226, and the ground pin 33 in that order. Therefore, the power on pin 31 receives the low level power on signal from the elastic conductive sheet 268, and the electronic device 100 is turned on. When the button 282 is pressed, the elastic conductive sheet 286 is electrically connected to the elastic conductive sheet 288, and elastic conductive sheet 288 is grounded through the elastic conductive sheet 286, the lock pin 228, the lock pin 226, and the ground pin 33 in that order. Therefore, the reset pin 32 receives the low level reset signal from the elastic conductive sheet 288, and the electronic device 100 is thus restarted.

When the electronic device 100 is shut down, the key 23 is rotated to make the lock pin 226 disconnect from the lock pin 228, then is pulled out from the keyhole 222. In this state, even if the buttons 262 and 282 are pressed, the electronic device 100 will not turned on, because the power on pin 31 will not receive the low level power on signal, and the reset pin 32 will not receive the low level reset signal. Therefore, the security of the electronic device 100 is improved.

While the disclosure has been described by way of example and in terms of preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A secure switch module for turning on an electronic device, the electronic device comprising a chassis and a motherboard received in the chassis, the motherboard comprising a power on pin and a ground pin grounded, the secure switch module comprising:
   a lock secured to the chassis and comprising a core, a keyhole defined in the core, a first lock pin electrically connected to the ground pin, and a second lock pin;
   a key matching the lock; and
   a power switch secured to the chassis and comprising a first button, a first elastic conductive sheet electrically connected to the second lock pin, and a second elastic conductive sheet electrically connected to the power on pin;
   wherein when the key is inserted into the keyhole and rotated, the core is rotated along with the key to make the first lock pin electrically connect to the second lock pin; when the first lock pin is electrically connected to the second lock pin and the first button is pressed, the first elastic conductive sheet is electrically connected to the second elastic conductive sheet, the second elastic conductive sheet is grounded through the first elastic conductive sheet, the second lock pin, the first lock pin, and the ground pin in that order, the power on pin receives a low level signal from the second elastic conductive sheet, and the electronic device is turned on.

2. The secure switch module of claim 1, further comprising a reset switch secured to the chassis, wherein the reset switch comprises a second button, a third elastic conductive sheet electrically connected to the second lock pin, and a fourth elastic conductive sheet electrically connected to a reset pin of the motherboard, when the first lock pin is electrically connected to the second lock pin and when the second button is pressed, the third elastic conductive sheet is electrically connected to the fourth elastic conductive sheet, the fourth elastic conductive sheet is grounded through the third elastic conductive sheet, the second lock pin, the first lock pin, and the ground pin in that order, the reset pin receives a low level signal from the fourth elastic conductive sheet, and the electronic device is restarted.

3. An electronic device comprising:
- a chassis;
- a motherboard received in the chassis and comprising a power on pin and a ground pin grounded; and
- a secure switch module comprising:
  - a lock secured to the chassis and comprising a core, a keyhole defined in the core, a first lock pin electrically connected to the ground pin, and a second lock pin;
  - a key matching the lock; and
  - a power switch secured to the chassis and comprising a first button, a first elastic conductive sheet electrically connected to the second lock pin, and a second elastic conductive sheet electrically connected to the power on pin;
- wherein when the key is inserted into the keyhole and rotated, the core is rotated along with the key to make the first lock pin electrically connect to the second lock pin; when the first lock pin is electrically connected to the second lock pin and the first button is pressed, the first elastic conductive sheet is electrically connected to the second elastic conductive sheet, the second elastic conductive sheet is grounded through the first elastic conductive sheet, the second lock pin, the first lock pin, and the ground pin in that order, the power on pin receives a low level signal from the second elastic conductive sheet, and the electronic device is turned on.

4. The electronic device of claim 3, wherein the motherboard further comprises a reset pin, the secure switch module further comprises a reset switch secured to the chassis, the reset switch comprises a second button, a third elastic conductive sheet electrically connected to the second lock pin, and a fourth elastic conductive sheet electrically connected to the reset pin, when the first lock pin is electrically connected to the second lock pin and the second button is pressed, the third elastic conductive sheet is electrically connected to the fourth elastic conductive sheet, the fourth elastic conductive sheet is grounded through the third elastic conductive sheet, the second lock pin, the first lock pin, and the ground pin in that order, the reset pin receives a low level signal from the fourth elastic conductive sheet, and the electronic device is restarted.

* * * * *